United States Patent
Kida

(10) Patent No.: US 6,735,671 B1
(45) Date of Patent: May 11, 2004

(54) SYSTEM FOR ACCESSING HARD DISK DRIVE BUILT IN COMPUTER IN WHICH HARD DISK DRIVE BUILT IN ITS COMPUTER CAN BE ACCESSED FROM OUTSIDE ITS COMPUTER EVEN IF COMPUTER IS NOT DRIVEN

(75) Inventor: Minoru Kida, Niigata (JP)

(73) Assignee: NEC Corporation, Tokyo (JP)

( * ) Notice: Subject to any disclaimer, the term of this patent is extended or adjusted under 35 U.S.C. 154(b) by 197 days.

(21) Appl. No.: 09/612,266

(22) Filed: Jul. 7, 2000

(30) Foreign Application Priority Data

Jul. 12, 1999 (JP) .......................... 11-196984

(51) Int. Cl.⁷ .............................. G06F 1/26
(52) U.S. Cl. .................. 711/111; 711/100; 711/154; 713/300
(58) Field of Search ................ 711/100, 154, 711/162; 713/300, 330

(56) References Cited

U.S. PATENT DOCUMENTS

| | | | | |
|---|---|---|---|---|
| 5,257,232 A | * | 10/1993 | Dhong et al. | 365/203 |
| 5,502,682 A | * | 3/1996 | Yoshimura | 365/226 |
| 5,530,879 A | * | 6/1996 | Crump et al. | 713/323 |
| 5,890,780 A | * | 4/1999 | Tomiyori | 307/86 |
| 5,969,438 A | * | 10/1999 | Odaohara | 307/80 |
| 6,020,761 A | * | 2/2000 | Hwang et al. | 326/80 |
| 6,034,508 A | * | 3/2000 | Chang | 320/138 |
| 6,128,743 A | * | 10/2000 | Rothenbaum | 713/300 |

FOREIGN PATENT DOCUMENTS

| | | |
|---|---|---|
| JP | 2-42119 | 3/1990 |
| JP | 6-149718 | 5/1994 |
| JP | 6-250791 | 9/1994 |
| JP | 8-101736 | 4/1996 |
| JP | 10-27154 | 1/1998 |
| JP | 10-124444 | 5/1998 |
| JP | 11-73245 | 3/1999 |

* cited by examiner

Primary Examiner—Tuan V. Thai
(74) Attorney, Agent, or Firm—Sughrue Mion, PLLC

(57) ABSTRACT

A system for accessing a hard disk drive built in computer includes a hard disk drive, a power supply, a controller, a power switching circuit and a signal controller. The hard disk drive stores data. The power supply supplies a power to the hard disk drive. The controller controls the hard disk drive by a internal control signal. The power switching circuit supplies one of the power and an external power which is supplied from an external computer. The signal controller selectively applies one of the internal control signal and an external control signal which is applied by the external computer.

17 Claims, 7 Drawing Sheets

Fig. 5

| POWER 4 | H | H | L |
|---|---|---|---|
| POWER(I/F3) | L | H | H |
| POWER CONT. 16 | L | L | H |
| SWITCHING CIRCUIT | POWER 4 | POWER 4 | POWER 4 |

Fig. 6

| POWER 4 | H | H | L |
|---|---|---|---|
| POWER(I/F3) | L | H | H |
| CSEL CONT. 11 | L | L | CSEL |
| EXP. POWER CONT. 10 | L | L | H |
| CSEL LOGIC CONT. 12 | L | L | CSEL |

Fig. 7

| POWER 4 | H | H | L |
|---|---|---|---|
| POWER(I/F3) | L | H | H |
| BS1 ENABLE | H | H | L |
| BS2 ENABLE | L | L | H |
| BS1 | CONNECT | CONNECT | CUT |
| BS2 | CUT | CUT | CONNECT |

Fig. 9

| POWER 4 | H | H | L |
|---|---|---|---|
| POWER (I/F3) | L | H | H |
| BS1 ENABLE | H | H | L |
| BS2 ENABLE | H | H | L |
| BS1 | CONNECT | CONNECT | CUT |
| BS3 | CONNECT | CONNECT | CUT |
| IDE-USB CONV. 24 | CUT | CUT | CONNECT |

SYSTEM FOR ACCESSING HARD DISK DRIVE BUILT IN COMPUTER IN WHICH HARD DISK DRIVE BUILT IN ITS COMPUTER CAN BE ACCESSED FROM OUTSIDE ITS COMPUTER EVEN IF COMPUTER IS NOT DRIVEN

BACKGROUND OF THE INVENTION

1. Field of the Invention

The present invention relates to a system for accessing a hard disk drive (HDD) built in a computer, in which an HDD built in a standalone computer can be accessed from outside the computer, even if a power supply of the computer is turned off.

2. Description of the Related Art

If a portable computer is used in a traveling destination, it is not connected to a network, such as LAN and the like, and it is used singly (standalone). In such usage condition, a data transfer from HDD to another computer is carried out through I/F (interface), such as SCSI and the like, for example, as detailed in Japanese Laid Open Patent Applications (JP-A-H06-149718, JP-A2H06-250791 and JP-A-H10-27154.).

In the above-mentioned conventional standalone computer, a power source of the standalone computer is turned on when data of a built-in HDD is transferred to another computer.

Thus, the built-in HDD can not be accessed, if the power source can not be turned on because of any reason (if a battery is discharge, if there is no supply of a power source from an AC adapter and the like, or if it is in trouble). That is, the data can not be transferred from the built-in HDD.

SUMMARY OF THE INVENTION

It is an object of the present invention is to provide a system for accessing HDD built in a computer, in which a built-in HDD built in a computer can be accessed through I/F from an external computer, irrespectively of a state of a power source of the computer.

In order to achieve an aspect of the present invention, a system for accessing a hard disk drive built in computer includes a hard disk drive, a power supply, a controller, a power switching circuit and a signal controller. The hard disk drive stores data. The power supply supplies a power to the hard disk drive. The controller controls the hard disk drive by a internal control signal. The power switching circuit supplies one of the power and an external power which is supplied from an external computer. The signal controller selectively applies one of the internal control signal and an external control signal which is applied by the external computer.

In order to achieve an aspect of the present invention, the system for accessing a hard disk drive built in computer further includes a master/slave controller which selectively sets an operation mode of the hard disk drive. The hard disk drive has Integrated Drive Electronics(IDE) form. The master/slave controller sets one of a master mode and a slave mode of the operation mode based on the external control signal.

In the above system for accessing a hard disk drive built in the computer, the power switching circuit supplies the power when the power supply is activated and supplies the external power when the power supply is inactivated.

In the above system for accessing a hard disk drive built in the computer, one of the power and the external power is supplied to the controller, the power switching circuit and the signal controller.

In order to achieve an aspect of the present invention, the system for accessing a hard disk drive built in the computer further includes IDE-USB (Integrated Drive Electronics—Universal Serial Bus) converter which connects the hard disk drive and a USB interface which is arranged on the interface for an external interface of the external computer. The hard disk drive has IDE form and is accessed by the external computer via the IDE-USB converter.

In order to achieve an aspect of the present invention, a system for accessing a hard disk drive built in computer further includes IDE-SCSI (Integrated Drive Electronics—Small Computer Serial Interface) converted which connects the hard disk drive and a SCSI interface which is arranged on the interface for an external interface of the external computer. The hard disk drive has IDE form and is accessed by the external computer via the IDE-SCSI converter.

In order to achieve an aspect of the present invention, the system for accessing a hard disk drive built in computer further includes IDE-RS232C (Integrated Drive Electronics—RS232C)converter which connects the hard disk drive and a RS232C interface which is arranged on the interface for an external interface of the external computer. The hard disk drive has IDE form and is accessed by the external computer via the IDE-RS232C converter.

In order to achieve an aspect of the present invention, the system for accessing a hard disk drive built in computer further includes IDE-GPIB (Integrated Drive Electronics—GPIB) converter which connects the hard disk drive and a GPIB interface which is arranged on the interface for an external interface of the external computer. The hard disk drive has IDE form and is accessed by the external computer via the IDE-GPIB converter.

In order to achieve an aspect of the present invention, a method of driving a hard disk drive built in computer includes a supplying process supplies a power from a power supply or an external power form an external computer to the hard disk drive via an interface and a controlling process controls the hard disk drive by an internal control signal or an external control signal which is applied by the external computer via the interface. The external control signal is applied by the external computer when the external power is supplied to the hard disk drive.

In order to achieve an aspect of the present invention, a method of driving a hard disk drive built in computer further includes a setting process sets an operation mode of the hard disk drive. The hard disk drive having Integrated Drive Electronics (IDE) form and the master/slave controller setting a master mode or a slave mode of the operation mode based on the external control signal.

In the above method of driving a hard disk drive built in computer, the power switching circuit supplies the power when the power supply is activated and supplying the external power when the power supply is inactivated.

In the above method of driving a hard disk drive built in computer, the power or the external power is supplied to the controller, the power switching circuit and the signal controller.

In order to achieve an aspect of the present invention, a method of driving a hard disk drive built in computer further includes a connecting process in which IDE-USB (Integrated Drive Electronics—Universal Serial Bus) converter is connected to the hard disk drive and a USB interface which is arranged on the interface for an external interface of the external computer. The hard disk drive has IDE form and is accessed by the external computer via the IDE-USB converter.

In order to achieve an aspect of the present invention, a method of driving a hard disk drive built in computer further includes a connecting process in which IDE-SCSI (Integrated Drive Electronics—Small Computer Serial Interface) converter is connected to the hard disk drive and a SCSI interface which is arranged on the M interface for an external interface of the external computer. The hard disk drive has IDE form and is accessed by the external computer via the IDE-SCSI converter.

In order to achieve an aspect of the present invention, a method for accessing a hard disk drive built in computer further includes a connecting process in which IDE-RS232C converter (Integrated Drive Electronics RS232C) is connected to the hard disk drive and a RS232C interface which is arranged on the interface for an external interface of the external computer. The hard disk drive has IDE form and is accessed by the external computer via the IDE-RS232C converter.

In order to achieve an aspect of the present invention, a method of driving accessing a hard disk drive built in computer further includes a connecting process in which IDE-GPIB (Integrated Drive Electronics—GPIB) converter is connected to the hard disk drive and a GPIB interface which is arranged on the interface for an external interface of the external computer. the hard disk drive has IDE form and is accessed by the external computer via the IDE-GPIB converter.

In order to achieve an aspect of the present invention, a method of driving a hard disk drive built in computer further includes a coupling process in which a hard disk drive of a computer is connected to a external computer via an interface, an applying process in which a power and control signal from the external computer is applied to the hard disk drive, and an accessing process accessing the hard disk drive which is activated by the power and the control signal by the external computer.

A computer according to the present invention is provided with an I/F for referring to an IDE signal to expand a peripheral apparatus, a power source switching circuit, an HDD signal control circuit, a built-in IDE-HDD and a Master/Slave setting circuit. In the computer, if a power source circuit is turned off, the built-in IDE-HDD is controlled by another computer through the I/F. That is, the built-in IDE-HDD in the computer functions as an external memory in the computer. Thus, even if a power source in one computer of a pair of computers is turned off, a data sharing and a data transfer can be done between the pair of computers.

BRIEF DESCRIPTION OF THE DRAWINGS

FIG. 5 is a view describing a first operation according to the present invention;

FIG. 6 is a view describing a second operation according to the present invention;

FIG. 7 is a view describing a third operation according to the present invention;

FIG. 9 is a view describing a fourth operation according to the present invention.

DESCRIPTION OF THE PREFERRED EMBODIMENTS

Figure 1:
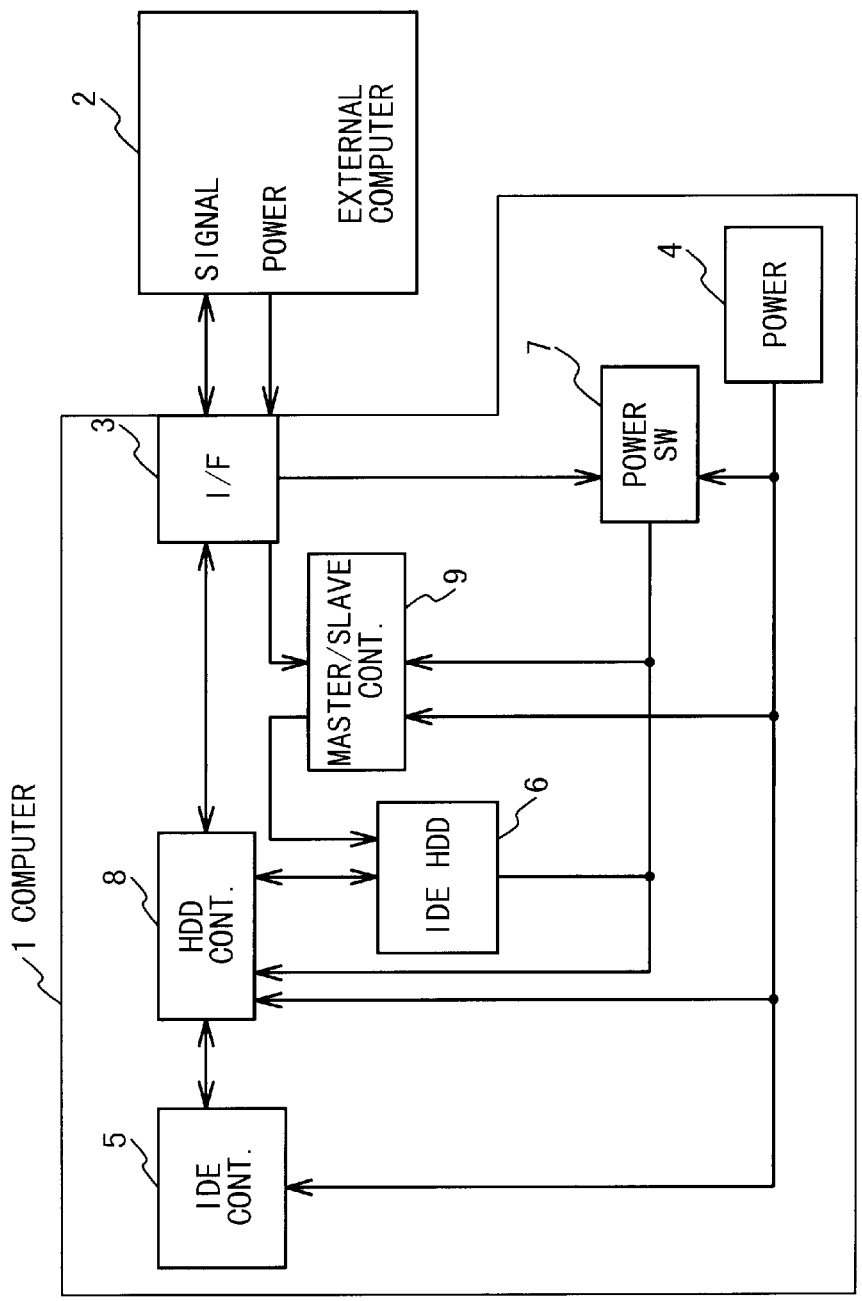
FIG. 1 is a block diagram according to an access system of the present invention.

Embodiments of the present invention will be described below in detail with reference to the attached drawings. FIG. 1 is a block diagram according to an access system of the present invention.

FIG. 1 shows the configuration in which IDE is used as I/F (interface from an external computer) of a computer.

The IDE is an abbreviation of Integrated Drive electronics, and it is one of interfaces to connect a hard disc for a personal computer. An apparatus (HDD, CD-ROM and the like) having the interface is referred to as an IDE device (IDE-HDD, IDE CD-ROM and the like). Presently, it is standardized as ATA (AT Attachment Interface) by American National Standards Institute (ANSI), and managed by a group referred to as X3T92 of the ANSI. One of features in the IDE lies in a fact that it can be directly controlled by BIOS through an IDE controller. This configuration does not require a special software and a special driver such as an SCSI drive. Thus, it can be easily established.

Another feature in this configuration lies in a fact that as a signal line used in the IDE, an Industry Standard Architecture (ISA) bus can be utilized as its substantially original state. This signal line can be used by preparing a simple address decoder (a circuit for collecting an address signal at a unit of 1 bit, and reading out an indicated address) and a buffer. The IDE controller can be created easily and cheaply. Those features enable the IDE interface to be widespread among the current personal computer.

In FIG. 1, a signal and an electrical power from the external computer 2 are supplied through the I/F 3 to the built-in IDE-HDD 6, the HDD signal control circuit 8 and the Master/Slave setting circuit 9, even if the built-in power source circuit 4 is turned off. This supply enables the operations of the built-in IDE-HDD 6 and a peripheral circuit thereof. Thus, a signal from the built-in IDE-HDD 6 is treated by the IDE controller of the external computer 2 through the I/F 3, and it can be used as a further increased HDD in the external computer 2.

Figure 2:
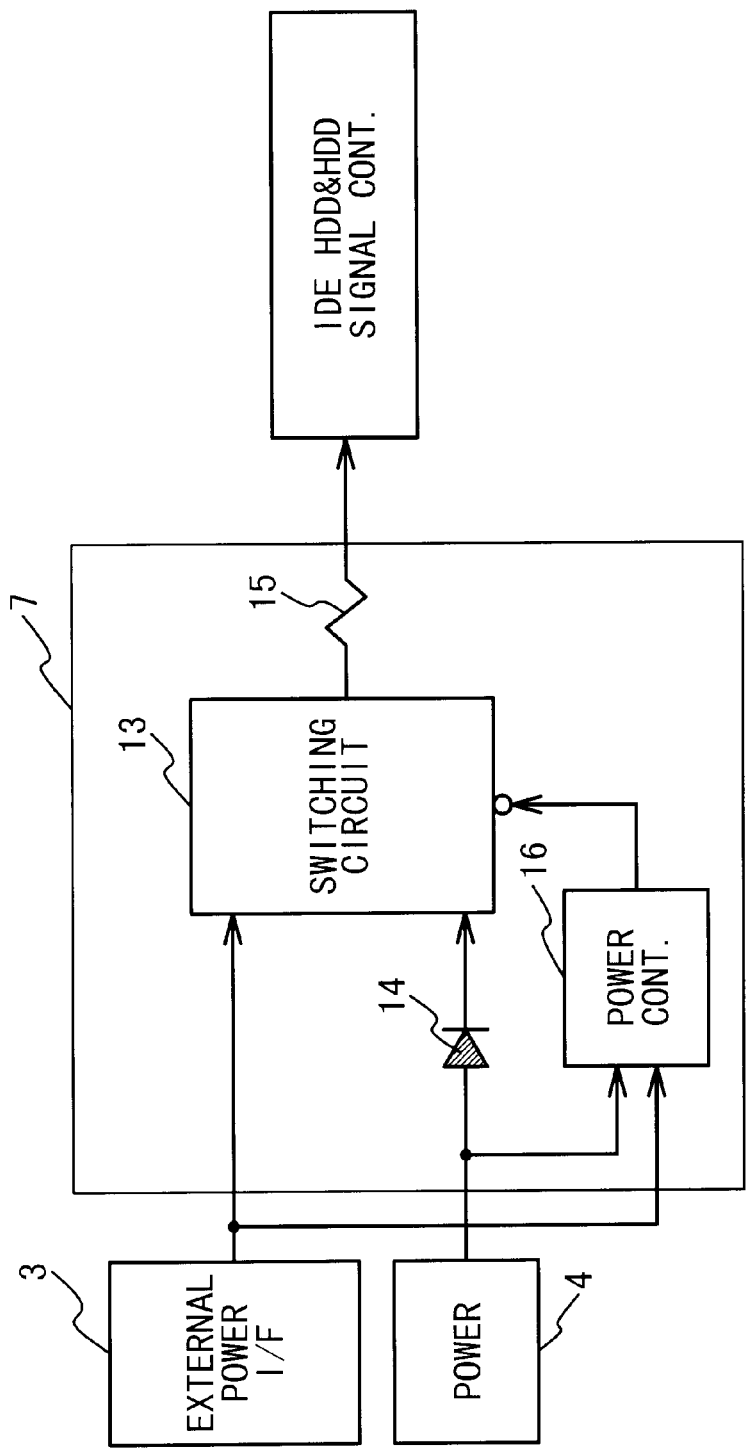
FIG. 2 view showing a configuration of a power source switching circuit 7 according to the present invention.

FIG. 2 is a view showing the configuration of the 10 power source switching circuit 7 according to the present invention. A switching circuit 13 selects any one of the I/F 3 and the built-in power source circuit 4, and supplies the electrical power to the built-in IDE-HDD 6 and the peripheral circuit thereof. An electrical power judgment circuit 16 reports to the switching circuit 13 the fact as to whether the electrical power is supplied from the built-in power source circuit 4 or the electrical power from the I/F 3 or from both of them. In accordance with this report, the switching circuit 13, if the electrical power is supplied from the built-in power source circuit 4, preferentially makes the built-in power source circuit 4 supply the electrical power, and cuts off the electrical power from the I/F 3. If the electrical power is not supplied from the built-in power source circuit 4 and then the electrical power is supplied from the I/F 3, it makes the I/F 3 supply the electrical power to the built-in IDE-HDD 6, the HDD signal control circuit 8 and the Master/Slave setting circuit 9. A diode 14 is mounted, for example, so as to prevent the electrical power from being supplied to the power source circuit, except the built-in IDE-HDD 6 and the peripheral circuit thereof, if the electrical power is supplied from external portion. A fuse 15 has a function of protecting the circuits within the computer if an excessive electrical power is supplied from the external portion.

Figure 3:
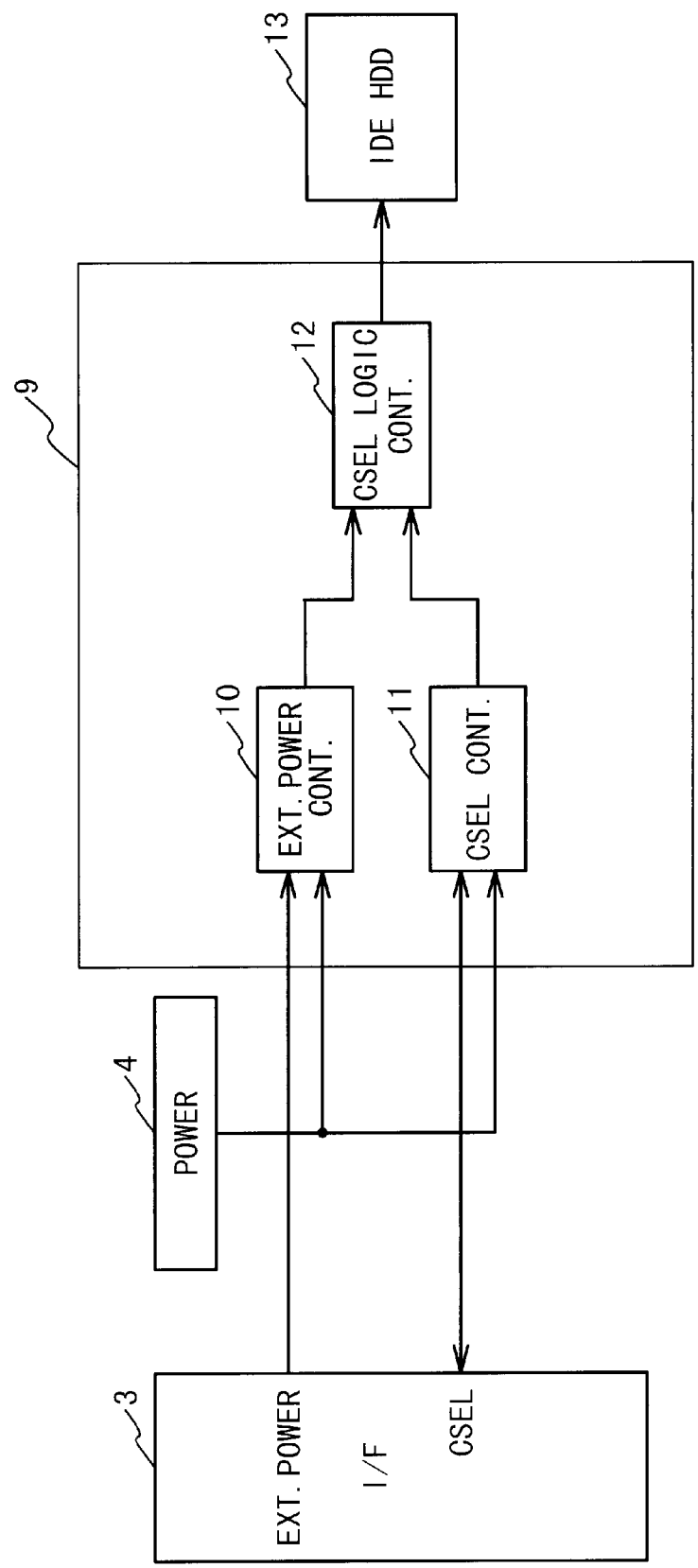
FIG. 3 is a block diagram showing a Master/Slave setting circuit 9 according to the present invention.

FIG. 3 is a block diagram showing the Master/Slave setting circuit 9 according to the present invention. An external power source recognition circuit 10 detects whether or not the electrical power supplied to the built-in IDE-HDD 6 is supplied from the I/F 3. A CSEL selection circuit 11, if the electrical power is supplied from the power source circuit 4, outputs HIGH (H) in a case of Slave, and outputs LOW (L) in a case of Master, in accordance with an initial setting in designing the built-in IDE-HDD 6 in the computer. On the other hand, the CSEL selection circuit 11, if the electrical power is not supplied from the power source circuit 4, outputs a CSEL signal of the I/F 3.

Finally, the built-in IDE-HDD 6, in accordance with the outputs from the power source judgment circuit 10 and the CSEL selection circuit 11, receives the CLEL signal treated by a CSEL determination logic circuit 12, and carries out the recognition of Master/Slave.

Figure 4:
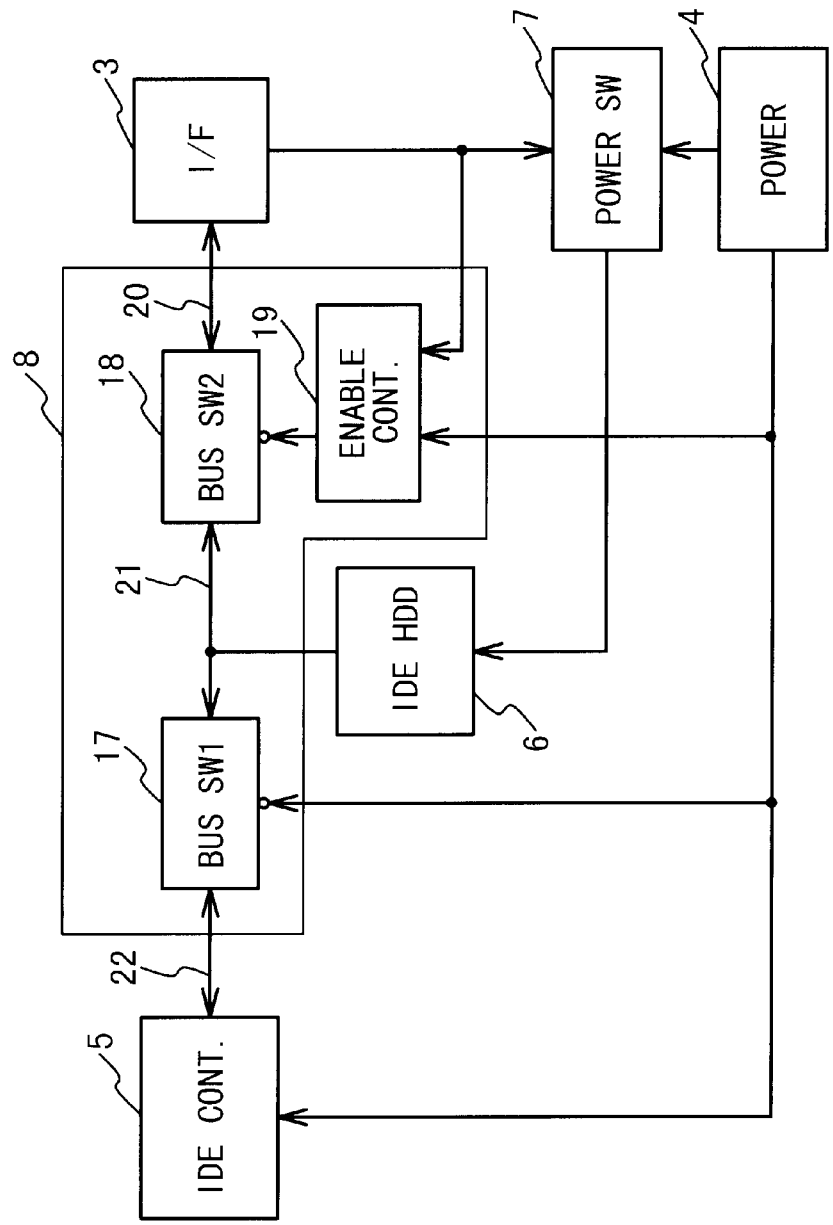
FIG. 4 is a block diagram showing an HDD signal control circuit 8 according to the present invention.

FIG. 4 is a block diagram showing the HDD signal control circuit 8 according to the present invention. If the built-in power source circuit 4 does not supply the electrical power, connection and disconnection with regard to signal lines 22, 21 and 20 of the HDD are established in accordance with the supply source of the electrical power, in order to avoid the influence on the external computer 2 resulting from an IDE controller 5. The connection and the disconnection are established by using a bus switch 1 (17) and a bus switch 2 (18) which function so as to connect or disconnect the signal lines in accordance with an enable signal.

The enable signals of the respective bus switches are established as follows. The enable signal of the bus switch 1 (17) sets the built-in power source circuit 4 at an output state. Also, the bus switch 2 (18) receives the enable signal from an enable signal synthesizing circuit 19. This enable signal synthesizing circuit 19 outputs the enable signal if the built-in power source circuit 4 is turned off and the electrical power is supplied from the I/F 3.

If the built-in power source circuit 4 is turned on, irrespectively of the power source from the I/F 3, the signal lines 21, 22 of the HDD are connected, and the signal lines 20, 21 are not connected. On the other hand, if 25 the built-in power source circuit 4 is turned off and the power source is supplied from the I/F 3, the signal lines 20, 21 of the HDD are connected, and the signal lines 21, 22 are not connected. By the way, the IDE controller 5 and the built-in IDE-HDD 6 are well known to one skilled in the art. Thus, the detailed explanation is omitted.

The operations of the circuit shown in FIG. 2 will be described below with reference to FIG. 5. FIG. 5 is a view illustrating a first operation according to the present invention. If the power source circuit 4 is at H and the power source of the I/F 3 is at L, the electrical power of the power source circuit 4 is supplied through the switching circuit 13 to the HDD signal control circuit and the built-in IDE-HDD 6. If the power source circuit 4 is at H and the power source of the I/F 3 is also at H, the electrical power is supplied from the power source circuit 4. If the power source circuit 4 is at L and the power source of the I/F 3 is at H, the electrical power of the I/F 3 is supplied through the switching circuit 13 to the HDD signal control circuit 8 and the built-in IDE-HDD 6. In addition, it is natural that the above-mentioned polarities H, L are one example, and it can be represented by using the reverse polarities. After that, they are similarly described.

The operations of the circuit shown in FIG. 3 will be described below with reference to FIG. 6. FIG. 6 is a view illustrating a second operation according to the present invention. Here, an initial setting of the built-in IDE-HDD 6 indicates the Master, and the CSEL determination logic circuit 12 is provided with AND circuits. The Master/Slave of the IDE-HDD 6 is established by a setting of a jumper switch or a CSEL signal. If the CSEL signal indicates Low (L), and High (H) for Master, it is set to Slave.

FIG. 6 shows an example that when the power source circuit 4 is at H, the built-in IDE-HDD 6 functions as the Master, namely, the CSEL of the HDD becomes at L. If the power source circuit 4 is at H and the power source of the I/F 3 (the power source form the external portion) is at L, the external power source recognition circuit 10 outputs L. The state of the CSEL selection circuit 11 is set at L. If the CSEL determination logic circuit 12 is at AND, its output becomes at L. The built-in IDE-HDD 6 is set so as to function as the master. Even if the power source circuit 4 is at H and the power source of the I/F .3 is at H, the external power source recognition circuit 10 outputs L. Thus, even if the CSEL selection circuit 11 outputs the CSEL signal from the I/F 3, since the CSEL determination logic circuit 12 is composed of the AND circuits, the CSEL selection circuit outputs L. If the power source circuit 4 is at L and the power source of the I/F 3 is at H, the external power source recognition circuit 10 outputs H. The CSEL selection circuit 11 outputs the CSEL signal of the I/F 3. Since the CSEL determination logic circuit 12 is at AND, the Master/Slave of the built-in IDE-HDD 6 is determined by the CSEL signal of the I/F 3, as a result.

The operations of the circuit according to the present invention shown in FIG. 4 will be described below with reference to FIG. 7. FIG. 7 is a view illustrating a third operation according to the present invention. A bus switch outputs an input signal only when the enable signal is at H. The enable signal synthesizing circuit 19 outputs L even if the power source is supplied from the I/F 3, when the electrical power is supplied from the power source circuit 4. It outputs H only when the built-in power source circuit 4 is turned off and the power source is supplied from the I/F 3. If the power source circuit 4 is at H and the power source from the I/F 3 is at L, the enable signal of the bus switch 1 (17) is at H, and the enable signal of the bus switch 2 (18) is at L. Thus, the bus switch 1 (17) becomes at a connection state, and the bus switch 2 (18) becomes at a disconnection state.

If the power source circuit 4 is at H and the power source from the I/F 3 is at H, the enable signal of the bus switch 1 (17) is at H, and the enable signal of the bus switch 2 (18) is at L. Thus, the bus switch 1 (17) becomes at the connection state, and the bus switch 2 (18) becomes at the disconnection state. If the power source circuit 4 is at L and the power source from the I/F 3 is at H, the enable signal of the bus switch 1 (17) is at L, and the enable signal of the bus switch 2 (18) is at H. Hence, the bus switch 2 (18) becomes at the connection state, and the bus switch 1 (17) becomes at the disconnection state.

As mentioned above, in the HDD access system according to the present invention, the built-in IDE-HDD can be controlled from another computer only by establishing the cable connection, even if the power source of the computer is turned off. This is because the circuit is mounted for supplying the power source only to the necessary section from the I/F to thereby enable the connection of the signal from the built-in IDE-HDD. Moreover, the Master/Slave of the built-in IDE-HDD can be established in accordance with the kind of the power source and the presence or absence thereof. When the IDE device is used, it is necessary to set whether the device is the Master or the Slave. However, the system of the present invention has the circuit for determining the CSEL signal from the I/F and the kind of the power source.

Figure 8:
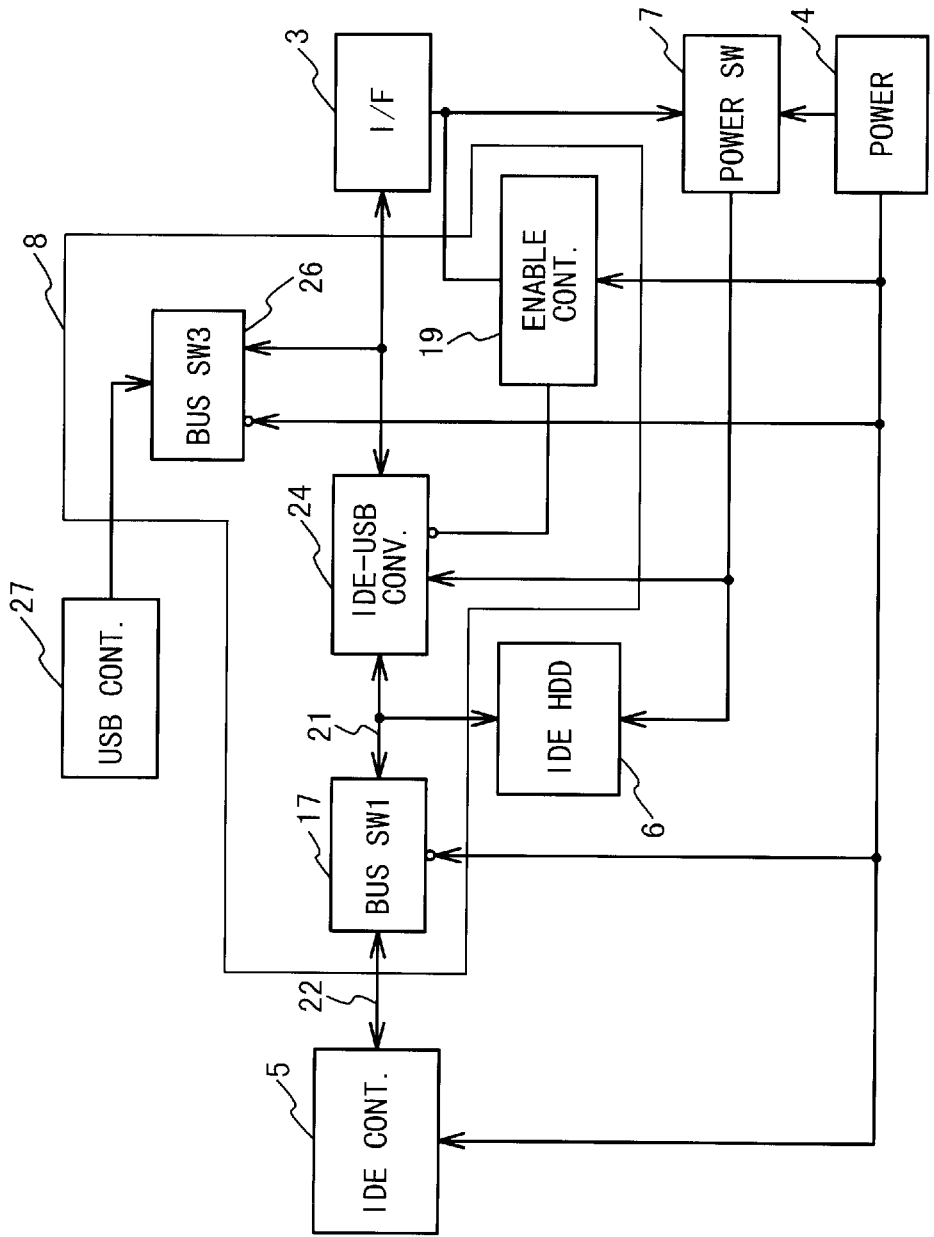
FIG. 8 is a block diagram showing an HDD signal control circuit according to the present invention.

In the present invention, USB may be used as the I/F. If the USB is used, the HDD signal control circuit 8 is changed, and the Master/Slave setting circuit 9 is removed. The change and the removal enable the achievement of the function similar to that of the above-mentioned embodiment. FIG. 8 shows a configuration example of the changed HDD signal control circuit 8. FIG. 8 is a block diagram showing the HDD signal control circuit according to the present invention. In FIG. 8, an IDE-USB conversion LSI 24 has a function of carrying out the mutual conversion between the USB signal and the HDD signal, and the function similar to that of the bus switch 2 (18) in FIG. 4. This LSI controls its output in accordance with the output from the enable signal synthesizing circuit 19. The enable signal synthesizing circuit 19 functions similarly to FIG. 4. A bus switch 3 (26) connects a signal if receiving H as the enable signal, similarly to the bus switch 1 (17) and the bus switch 2 (18) in FIG. 4. In short, it receives H even if the power source is supplied from he I/F 3, when the power source is supplied from the built-in power source circuit 4. It receives L only if the built-in power source circuit 4 is turned off and the power source is supplied from the I/F 3. Thus, it carries out the operations shown in a table 4.

The operations of the HDD signal control circuit according to the present invention shown in FIG. 5 will be described below with reference to FIG. 9. FIG. 9 is a view illustrating a fourth operation according to the present invention. An IDE-USB conversion LSI 24 shown in FIG. 9, if an output of the enable signal synthesizing circuit 19 is at L, does not convert the USB signal into the HDD signal, and has no influence on the HDD signal line 21. Conversely, if the output of the enable signal synthesizing circuit 19 is at H, it carries out the mutual conversion between the USB signal and the HDD signal. The bus switch 3 (26), if the built-in power source circuit 4 is turned on, receives H as the enable signal. The following operations are done under the supplied power source. If the power source circuit 4 is at H and the power source of the USB (the power source from the I/F 3) is at H, the enable signal of the bus switch 3 (26) is at H. Thus, the bus switch 3 (26) becomes at the connection state. If the power source circuit 4 is at L and the power source of the USB (the power source from the I/F 3) is at H, the enable signal of the bus switch 3 (26) is at L. Hence, the bus switch 3 (26) becomes at the disconnection state. If the power source circuit 4 is at H and the power source of the USB is at L, the enable signal of the bus switch 3 (26) is at H. Hence, the bus switch 3 (26) becomes at the connection state. However, this is at the state that the USB is not connected. Hence, it has no influence on the system.

As mentioned above, the HDD can be controlled from the external portion, only if the built-in power source is turned off and the USB is connected, without the influence on the HDD signal, in the case of the existence of the built-in power source. Here, the IDE controller 5, the built-in IDE-HDD 6 and the USB controller 27 are well known to one skilled in the art. Thus, the detailed explanation is omitted.

By the way, the case of using the USB in the I/F is described in another embodiment of the present invention. However, in a case of other interfaces, for example, even in a case of I/F such as SCSI, RS232C and GPIB, it can be similarly attained. Advantageous Effects of the Invention As mentioned above, in the HDD access system according to the present invention, the HDD built in the computer can be accessed from the external computer, through the I/F, when the power source of the computer is turned off.

What is claimed is:

1. A system for accessing a hard disk drive built into a computer, comprising:
    a hard disk drive storing data, the hard disk drive being built into a computer;
    a power supply supplying a first power to the hard disk drive;
    a controller controlling the hard disk drive based on a control signal;
    a power switching circuit selectively supplying one of the first power from a source within said computer and an external power from an external computer; and
    a signal controller selectively applying one of an internal control signal and an external control signal which is applied from the external computer, as the control signal to the controller,
    wherein said external power is supplied to said hard disk drive in response to said external control signal.

2. A system for accessing a hard disk drive built into a computer as claimed in claim 1 further comprising:
    a master/slave controller setting an operation mode of the hard disk drive,
    wherein the hard disk drive has an Integrated Drive Electronics (IDE) form and the master/slave controller selectively sets one of a master mode and a slave mode of the operation mode based on the external control signal.

3. A system for accessing a hard disk drive built into a computer as claimed in claim 1,
    wherein the power switching circuit supplies the power when the power supply is activated and supplies the external power when the power supply is deactivated.

4. A system for accessing a hard disk drive built into a computer as claimed in claim 1,
    wherein the power or the external power is supplied to the controller, the power switching circuit and the signal controller.

5. A system for accessing a hard disk drive built into a computer as claimed in claim 1,
    wherein the external computer is connected to the computer via an interface of the computer, and
    the interface comprises an IDE—USB (Integrated Drive Electronics—Universal Serial Bus) converter connecting the hard disk drive and a USB interface which is arranged on the interface for an external interface of the external computer,
    wherein the hard disk drive has the IDE form and the hard disk drive is accessed by the external computer via the IDE—USB converter.

6. A system for accessing a hard disk drive built into a computer as claimed in claim 1, wherein the external computer is connected to the computer and an interface of the computer, and
    the interface comprises an IDE—SCSI (Integrated Drive Electronics—Small Computer Serial Interface) converter connecting the hard disk drive and a SCSI interface which is arranged on the interface for an external interface of the external computer,
    wherein the hard disk drive has IDE form and the hard disk drive is accessed by the external computer via the IDE—SCSI converter.

7. A system for accessing a hard disk drive built into a computer as claimed in claim 1,
   wherein the external computer is connected to the computer and an interface of the computer, and
   the interface comprises an IDE—RS232C (Integrated Drive Electronics—RS232C) converter connecting the hard disk drive and a RS232C interface which is arranged on the interface for an external interface of the external computer,
   wherein the hard disk drive has IDE form and the hard disk drive is accessed by the external computer via the IDE—RS232C converter.

8. A system for accessing a hard disk drive built into a computer as claimed in claim 1,
   wherein the external computer is connected to the computer and an interface of the computer, and
   the interface comprises an IDE—CPIS (Integrated Drive Electronics GPIB) converter connecting the hard disk drive and a GPIB interface which is arranged on the interface for an external interface of the external computer,
   wherein the hard disk drive has IDE form and hard disk drive is accessed by the external computer via the IDE—GPIB converter.

9. A method of driving a hard disk drive built into a first computer by a second computer, comprising:
   transmitting external power and an external control signal from the second computer to the first computer;
   selectively supplying to the hard disk drive built into the first computer one of internal power from a power supply associated with the first computer and the external power received from the second computer, based on whether the power supply is activated; and
   controlling the hard disk drive based on one of an internal control signal and the external control signal to drive the hard disk drive,
   wherein said external power is supplied to said hard disk drive in response to said external control signal.

10. A method of driving a hard disk drive built into a first computer as claimed in claim 9, further comprising:
    setting an operation mode of the hard disk drive,
    wherein the hard disk drive has an Integrated Drive Electronics (IDE) form and a master/slave controller selectively sets one of a master mode and a slave mode of the operation mode based on the external control signal.

11. A method of driving a hard disk drive built into a first computer as claimed in claim 9,
    wherein a power switching circuit supplies the internal power when the power supply is activated and supplies the external power when the power supply is deactivated.

12. A method of driving a hard disk drive built into a first computer as claimed in claim 9,
    wherein one of the internal power and the external power is supplied to the controller, the power switching circuit and the signal controller.

13. A method of driving a hard disk drive built into a first computer as claimed in claim 9, further comprising connecting an IDE—USB (Integrated Drive Electronics-Universal Serial Bus) converter to the hard disk drive and a USB interface which is arranged on the interface for an external interface of the external computer;
    wherein the hard disk drive has IDE form and is accessed by the external computer via the IDE—USB converter.

14. A method of driving a hard disk drive built into a first computer as claimed in claim 9, further comprising connecting an IDE—SCSI (Integrated Drive Electronics-Small Computer Serial Interface) converter to the hard disk drive and a SCSI interface which is arranged on the interface for an external interface of the external computer;
    wherein the hard disk drive has IDE form and the hard disk drive is accessed by the external computer via the IDE—SCSI converter.

15. A method of driving a hard disk drive build into a first computer as claimed in claim 9, further comprising connecting an IDE—RS232C (Integrated Drive Electronics-RS232C) converter to the hard disk drive and a RS232C interface which is arranged on the interface for an external interface of the external computer;
    wherein the hard disk drive has IDE form and is accessed by the external computer via the IDE—RS232C converter.

16. A method of driving a hard disk drive build into a first computer as claimed in claim 9, further comprising connecting an IDE—GPIB (Integrated Drive Electronics-GPIB) converter to the hard disk drive and GPIB interface which is arranged on the interface for an external interface of the external computer;
    wherein the hard disk drive has IDE form and is accessed by the external computer via the IDE—GPIB converter.

17. A method of driving a hard disk drive build into a first computer as claimed in claim 9, further comprising coupling a hard disk drive of a first computer to an external computer via an interface;
    applying power and a control signal from the external computer to the hard disk drive;
    accessing the hard disk drive which is activated by the power and the control signal from the external computer.

* * * * *

UNITED STATES PATENT AND TRADEMARK OFFICE
CERTIFICATE OF CORRECTION

PATENT NO. : 6,735,671 B1
DATED : May 11, 2004
INVENTOR(S) : Minoru Kida

It is certified that error appears in the above-identified patent and that said Letters Patent is hereby corrected as shown below:

Column 5,
Line 43, "25" has been removed;

Column 6,
Line 19, ".3" has been replaced with -- 3 --;

Column 7,
Line 46, "Land" has been replaced with -- L and --.

Signed and Sealed this

Seventeenth Day of August, 2004

JON W. DUDAS
*Acting Director of the United States Patent and Trademark Office*